(12) United States Patent
Sakai

(10) Patent No.: US 7,904,816 B2
(45) Date of Patent: Mar. 8, 2011

(54) INFORMATION PROCESSING APPARATUS, METHOD OF CONTROLLING SAME, PROGRAM AND STORAGE MEDIUM

(75) Inventor: Katsuya Sakai, Akiruno (JP)

(73) Assignee: Canon Kabushiki Kaisha (JP)

( * ) Notice: Subject to any disclaimer, the term of this patent is extended or adjusted under 35 U.S.C. 154(b) by 927 days.

(21) Appl. No.: 11/766,928

(22) Filed: Jun. 22, 2007

(65) Prior Publication Data
US 2008/0115059 A1     May 15, 2008

(30) Foreign Application Priority Data
Nov. 14, 2006  (JP) ................................ 2006-308407

(51) Int. Cl.
*G06F 15/177* (2006.01)
*G06F 3/12* (2006.01)
(52) U.S. Cl. ......... 715/734; 715/735; 715/738; 715/739; 358/1.15; 358/1.13
(58) Field of Classification Search .................. 715/734, 715/735, 738, 739, 821, 822; 358/1.15, 1.13
See application file for complete search history.

(56) References Cited

U.S. PATENT DOCUMENTS

| | | | | |
|---|---|---|---|---|
| 6,563,944 | B1 * | 5/2003 | Kumada ..................... | 382/162 |
| 6,996,555 | B2 * | 2/2006 | Muto et al. ..................... | 1/1 |
| 7,085,763 | B2 * | 8/2006 | Ochiai et al. ..................... | 1/1 |
| 7,102,774 | B2 * | 9/2006 | White ..................... | 358/1.15 |
| 7,239,408 | B1 * | 7/2007 | Whitmarsh et al. ......... | 358/1.15 |

FOREIGN PATENT DOCUMENTS

| | | |
|---|---|---|
| JP | 2004-110375 A | 4/2004 |
| JP | 2006-107081 A | 4/2006 |

* cited by examiner

*Primary Examiner* — Tadeese Hailu
(74) *Attorney, Agent, or Firm* — Rossi, Kimms & McDowell LLP

(57) ABSTRACT

In a case where a plurality of service providing devices having different capabilities are operated in association and a service providing device is utilized, operability when setting functions is improved for the user. Provided is an information processing apparatus for utilizing services capable of being provided by a plurality of service providing devices that exist on a network. The apparatus includes an information acquiring unit configured to acquire device information concerning the plurality of service providing devices and service-related information relating to services capable of being provided by the plurality of service providing devices; a first display control unit configured to display a list of service functions of available services; a service-function selecting unit configured to select a service function to be utilized from the list of service functions of available services displayed; a service-function judging unit configured to judge utilizable service functions based upon the selected service to be utilized; and a second display control unit configured to identifiably display the utilizable service functions.

3 Claims, 14 Drawing Sheets

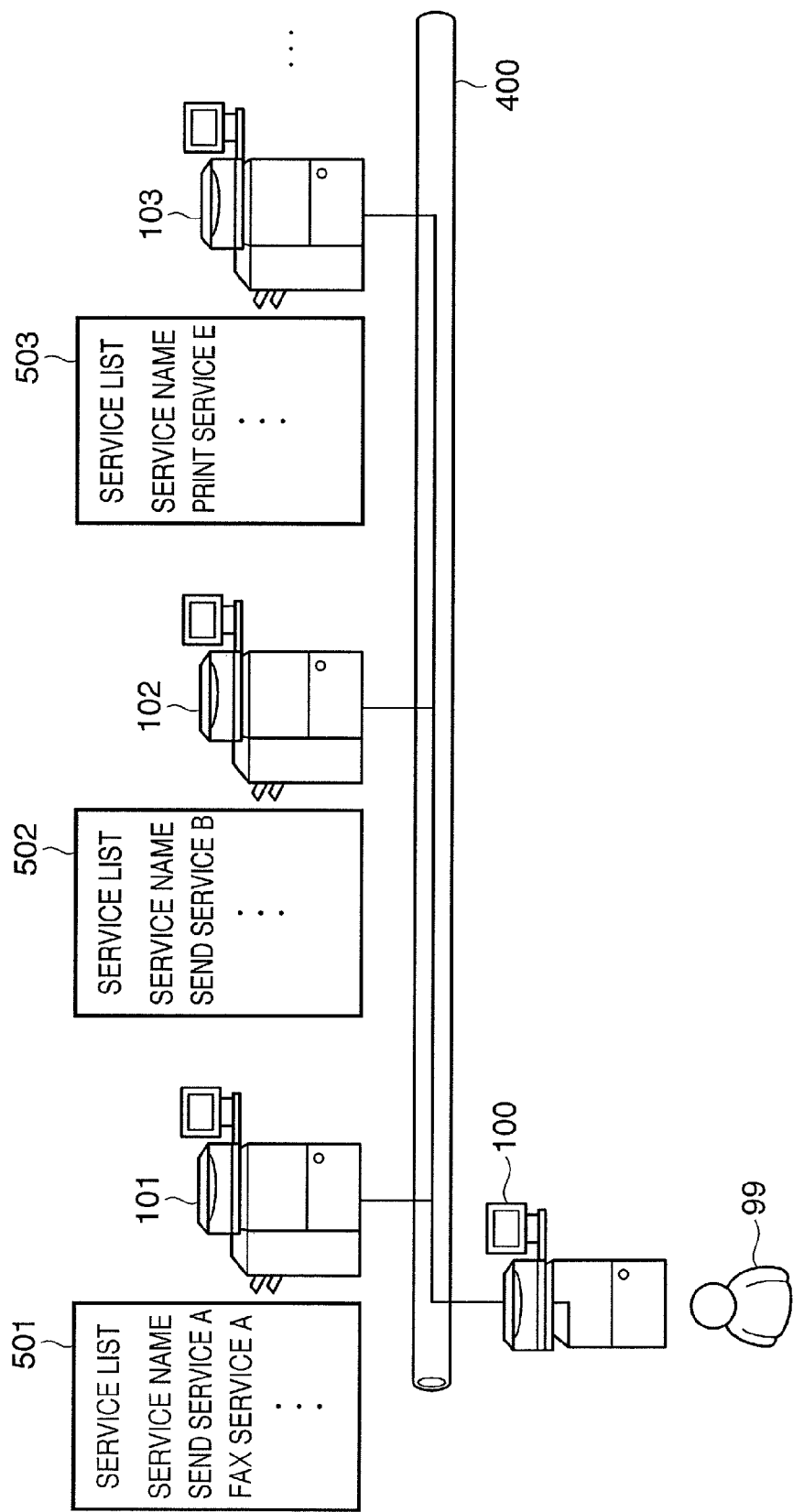

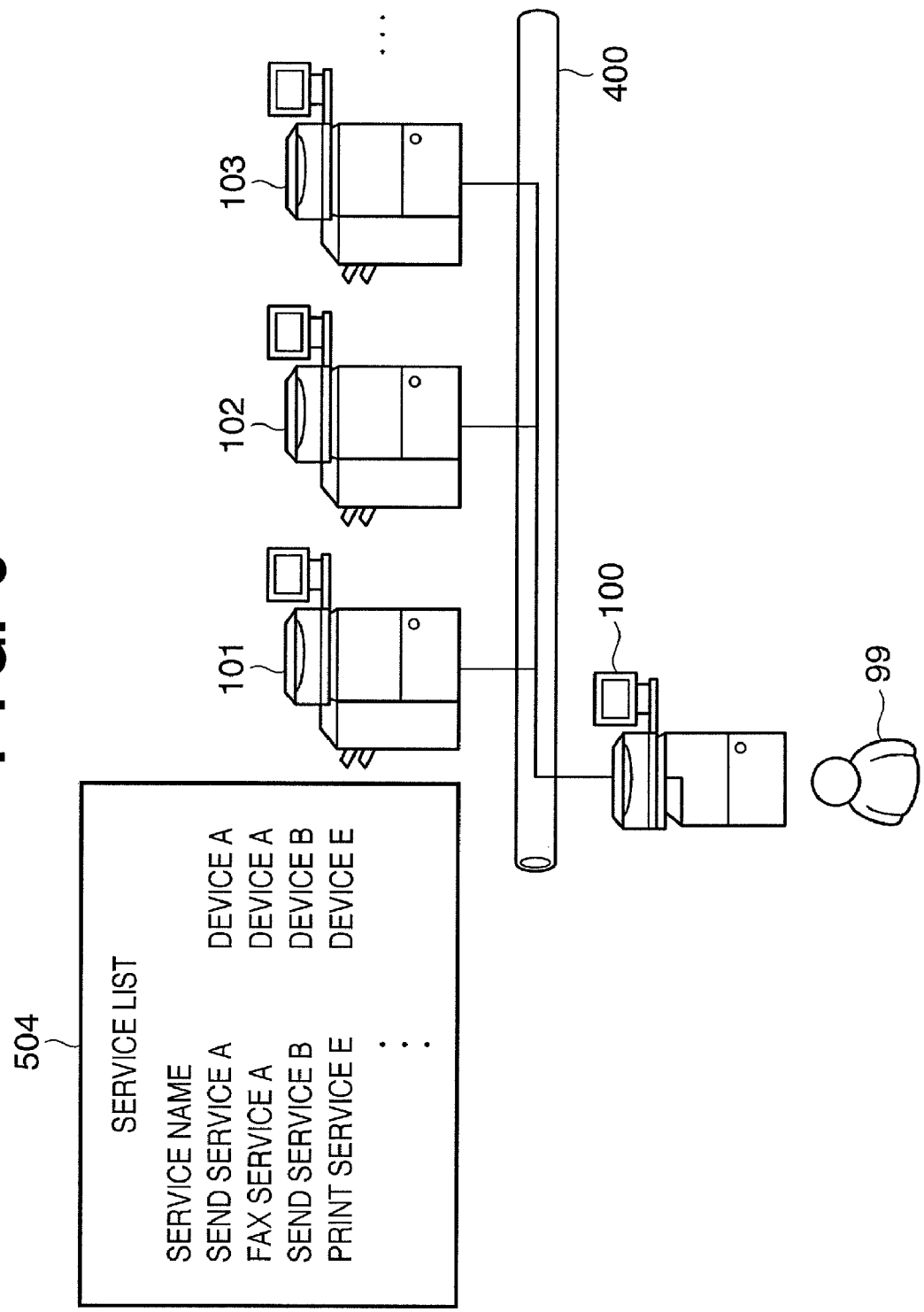

| SERVICE NAME | SERVICE INFORMATION | DEVICE NAME | DEVICE INFORMATION |
|---|---|---|---|
| Print A | Copy, PS | Device A | Color, Shift-Tray, Duplexer, A4(1000), A3(500) |
| Print B | Copy, LIPS | Device B | Color, Puncher, Stapler, Duplexer, A4(2500), A3(500) |
| Print C | Copy, LIPS | Device C | Color, Puncher, Stapler, Duplexer, A4(1000), A3(500) |
| Print D | Copy, PCL | Device D | Color, Duplexer, A4(250) |
| Print E | Copy, PDF | Device E | Black/White, A4(250) |
| Print F | Copy, PCL, PS | Device F | Black/White, Duplexer, A4(250) |
| Print G | Copy, LIPS | Device G | Color, Duplexer, A4(1000), A3(500) |
| Print H | Copy, LIPS | Device H | Color, Duplexer, A4(500), A3(100) |
| Print I | Copy, LIPS | Device I | Color, Puncher, Stapler, Duplexer, A4(1000), A3(500) |
| Print J | Copy, LIPS | Device J | Color, Puncher, Stapler, Duplexer, A4(2000), A3(500) |
| Print K | Copy, PDF | Device K | Black/White, A4(250) |
| Print L | Copy, PDF | Device L | Color, A4(250) |
| Print M | Copy, LIPS | Device M | Color, Puncher, Stapler, Duplexer, A4(1000), A3(100) |
| Print N | PS, PCL, PDF | Device N | Color, Duplexer, A4(1000), A3(500) |
| Print O | PS, PCL, PDF | Device O | Color, A4(2000) |
| Send B | Email, FTP, SMB | Device B | Color, Puncher, Stapler, Duplexer, A4(2500), A3(500) |
| Send C | Email, FTP, SMB | Device C | Color, Puncher, Stapler, Duplexer, A4(1000), A3(500) |
| Send I | Email, FTP, iFAX | Device I | Color, Puncher, Stapler, Duplexer, A4(1000), A3(500) |
| Send J | Email, FTP, iFAX | Device J | Color, Puncher, Stapler, Duplexer, A4(2000), A3(500) |
| Send M | Email, FTP | Device M | Color, Puncher, Stapler, Duplexer, A4(1000), A3(100) |
| FAX A | G3, G4 | Device A | Color, Shift-Tray, Duplexer, A4(1000), A3(500) |

INFORMATION PROCESSING APPARATUS, METHOD OF CONTROLLING SAME, PROGRAM AND STORAGE MEDIUM

BACKGROUND OF THE INVENTION

1. Field of the Invention

The present invention relates to an information processing apparatus which utilizes services provided by a plurality of service providing devices that exist on a network, a method of controlling this apparatus, a program for implementing the control method and a storage medium storing the program.

2. Description of the Related Art

In a technique available in the art, the result of a search of service items is presented to a user in the form of a list, the user is allowed to select from the list a desired service item and an information device that provides the service, and the service capable of being provided by the selected information device is utilized. In order to allow the user to select the desired service item from among multiple service items, it is necessary to present a user which information device provides what function, i.e., service. In order to solve this problem, a technique utilizing icons indicating functions has been disclosed in the specification of Japanese Patent Application Laid-Open No. 2004-110375. This technique is such that when a list of information devices that provide services is displayed, the functions possessed by the information devices are displayed as icons and rearranged, whereby a list of information devices function by function is supplied to the user.

Further, the specification of Japanese Patent Application Laid-Open No. 2006-107081, for example, discloses a technique for improving user operability, namely a technique in which a management server apparatus or the like in a network is queried with regard to available services, and a selecting operation by the user is inhibited in relation to non-available services.

However, in a case where it is desired to find another information device that is capable of providing a function equal to a function capable of being provided by a selected information device, the invention disclosed in Japanese Patent Application Laid-Open No. 2004-110375 is disadvantageous in that the user is required to compare the function-indicating icons with one another and the user him/herself is required to make the decision. Consequently, in a case where it is desired to select and utilize a plurality of services having equal functions, the operation for selecting the information device is a burden borne by the user.

Further, in a case where a plurality of services of the same type are utilized simultaneously, all of the service items do not necessarily provide the same functions. For example, in a case where a plurality of print services are utilized to perform an output, all of the print services do not necessarily support a double-sided printing function. In view of these circumstances, merely using the invention disclosed in Japanese Patent Application Laid-Open No. 2006-107081 will not make it possible to provide a user with user-friendly operability in the setting of functions in cases where services of the same type are utilized simultaneously.

SUMMARY OF THE INVENTION

Accordingly, an object of the present invention is to make it possible to readily identify a service item having a function equal to that of a service item selected by a user, thereby enhancing user convenience. Also enhanced is operability in terms setting functions in a case where a plurality services of the same type are utilized simultaneously.

According to one aspect of the present invention, an information processing apparatus for utilizing services provided by a plurality of service providing devices that exist on a network, comprises an information acquiring unit configured to acquire device information concerning the plurality of service providing devices and service-related information relating to services capable of being provided by the plurality of service providing devices; a first display control unit configured to display a list of service functions of available services based upon the device information and service-related information; a service-function selecting unit configured to select a service function to be utilized from the list of service functions of available services displayed by the first display control unit; a service-function judging unit configured to judge utilizable service functions based upon the service to be utilized selected by the service-function selecting unit; and a second display control unit configured to identifiably display the utilizable service functions judged by the service-function judging unit.

According to another aspect of the present invention, a method of controlling an information processing apparatus for utilizing services provided by a plurality of service providing devices that exist on a network, comprises an information acquiring step adapted to acquire device information concerning the plurality of service providing devices and service-related information relating to services capable of being provided by the plurality of service providing devices; a first display control step adapted to display a list of service functions of available services based upon the device information and service-related information; a service-function selecting step adapted to select a service function to be utilized from the list of service functions of available services displayed at the first display control step; a service-function judging step adapted to judge utilizable service functions based upon the service to be utilized selected at the service-function selecting step; and a second display control step adapted to identifiably display the utilizable service functions judged at the service-function judging step.

In accordance with the present invention, an available service having a function equal to that of a service selected by a user can be displayed in an easily identifiable manner, and user convenience can be enhanced as a result. Furthermore, it is possible to improve operability in terms of setting functions in a case where a plurality of services of the same type are utilized simultaneously.

Further features of the present invention will become apparent from the following description of exemplary embodiments with reference to the attached drawings.

BRIEF DESCRIPTION OF THE DRAWINGS

FIG. 4 is a diagram useful in describing a further example of the configuration of an information processing apparatus according to an embodiment of the present invention;

FIG. 5 is a diagram useful in describing a further example of the configuration of an information processing apparatus according to an embodiment of the present invention;

FIG. 6 is a diagram useful in describing an example of a search result list used by an information processing apparatus according to an embodiment of the present invention;

DESCRIPTION OF THE EMBODIMENTS

First Embodiment

Figure 1:
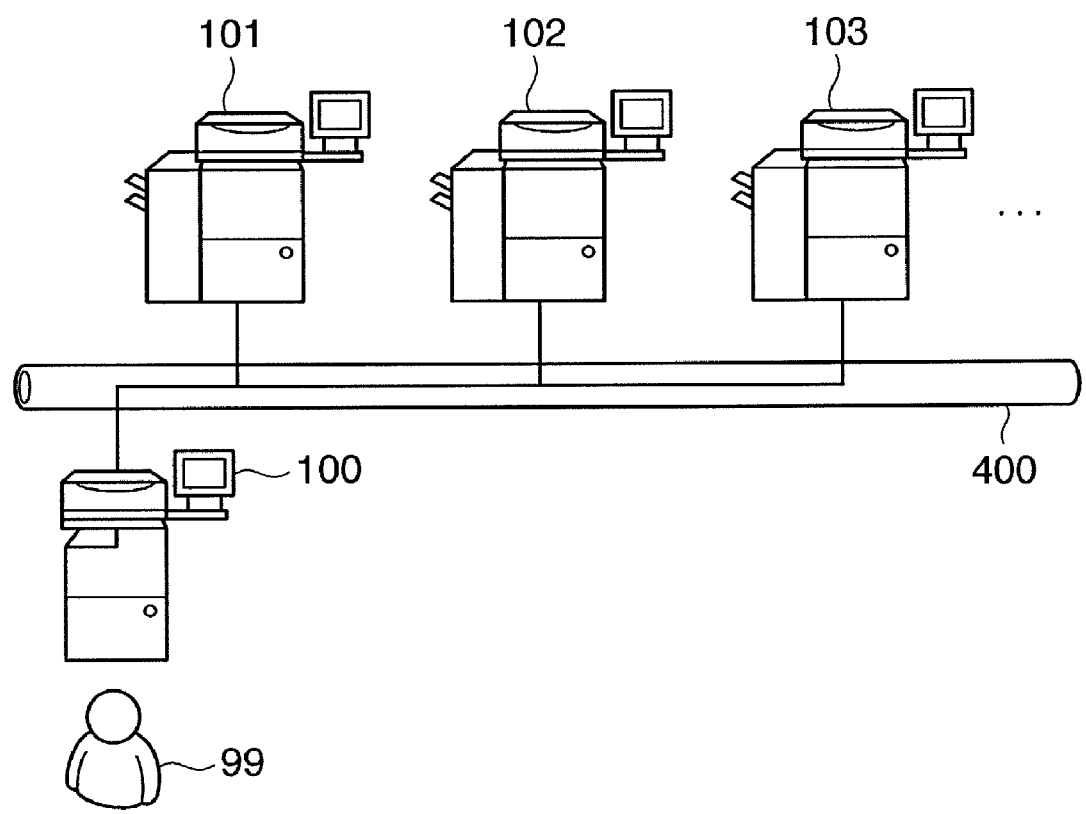
FIG. 1 is a diagram useful in describing an example of the configuration of an information processing apparatus according to an embodiment of the present invention.
Figure 2:
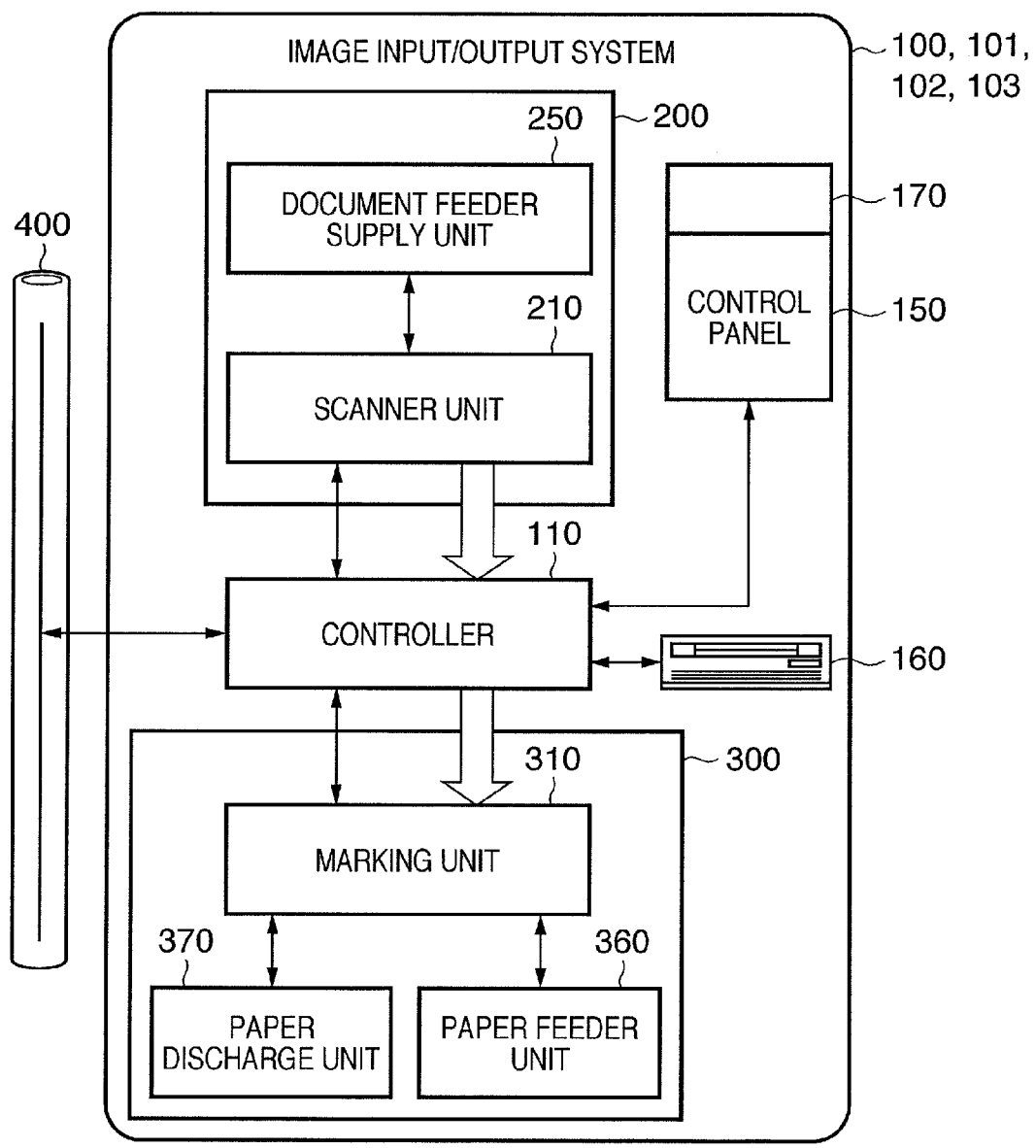
FIG. 2 is a diagram useful in describing an example of an image forming apparatus applicable to an information processing apparatus according to an embodiment of the present invention.

The configuration of an information processing apparatus to which an embodiment of the present invention is applicable will be described with reference to FIG. 1. As illustrated in FIG. 1, a single service utilizing device 100 and at least three service providing devices 101, 102 and 103 are connected via a LAN 400. Although a service utilizing device and a plurality of service providing devices are connected, naturally the number of these devices can be set at will. These may be image forming apparatuses. One example of the typical structure of such an image forming apparatus will be described with reference to FIG. 2.

First, a reader section 200 reads a document image optically and converts the image to image data. The reader section 200 is constituted by a scanner unit 210 having a document reading function, and a document feeder unit 250 having a function for feeding document sheets. Depending upon the type of image forming apparatus, the apparatus may not have the document feeder unit 250 (in such case the document is read upon being placed upon a document glass table).

A printer section 300 feeds printing paper, prints image data on the paper as a visible image and discharges the paper to the exterior of the image forming apparatus. The printer section 300 is constituted by a paper feeder unit 360 having a plurality of types of printing paper cassettes, a marking unit 310 for transferring the image of the image data to printing paper and fixing the image on the paper, and a paper discharge unit 370 for sorting and stapling the printing paper on which printing has been performed and outputting the paper to the exterior of the image forming apparatus. A controller 110 is electrically connected to the reader section 200 and printer section 300 and is further connected to the LAN 400.

The controller 110, which has a CPU and a work memory, etc., loads program code, which has been stored on a harddisk drive 170, into the work memory. The program code is interpreted by the CPU, whereby the operation of the overall image processing apparatus is controlled.

The controller 110 provides a copy function for controlling the reader section 200 so that the image on the document is read in as image data, and for controlling the printer section 300 so that the image data read in is printed and output on the printing paper. Further, the controller 110 provides a network scanner function for converting image data, which has been read in from the reader section 200, to code data and transmitting the code data to a host computer (e.g., a service management server 109 in FIG. 3) via the LAN 400. Furthermore, the controller 110 has a printer function for converting code data, which has been received from a host computer via the LAN 400, to image data, and outputting the image data to the printer section 300. These functions are available service functions.

A control panel 150, which has a liquid crystal display unit 160, a touch-sensitive panel input device (not shown) affixed to the liquid crystal display unit 160, and a plurality of hard keys (not shown), provides a user interface for allowing a user 99 to perform a variety of operations. A signal that has been input by the touch-sensitive panel or hard keys is sent to the controller 110. The liquid crystal display unit 160 displays image data that has been sent from the controller 110. Accordingly, the controller 110 functions as display control means for presenting a display on the liquid crystal display unit 160.

With reference again to FIG. 1, the service providing devices 101, 102, 103 are capable of providing various available services, which are possessed by the respective service providing devices, to an external apparatus as services. The service utilizing device 100 utilizes services, which are provided in the service providing devices 101, 102, 103, via the LAN 400 in response to a command based upon an operation performed by the user 99. Alternatively, in certain cases there are also instances where the service utilizing device 100 itself accepts a service upon deciding to do so actively.

Further, in order to provide their services, it is also possible for the service providing devices 101, 102, 103 to present the external service utilizing device 100 beforehand with information indicating which of available service items they can provide. The service utilizing device 100 searches this information, confirms the service items, subsequently decides the available service item to be utilized by the user and actually utilizes the service.

In relation to this service management technique, UDDI (Universal Description, Discovery and Integration) employed in Web service technology is widely known. UDDI is a so-called service repository.

Owner of the service providing devices registers service-related information such as service information to be opened, a service name, a type of service, an interface definition, an access point, etc. in this UDDI. Then, it becomes possible for an owner of the service utilizing device to acquire the above-mentioned service-related information by asking available service items to the UDDI.

Figure 3:
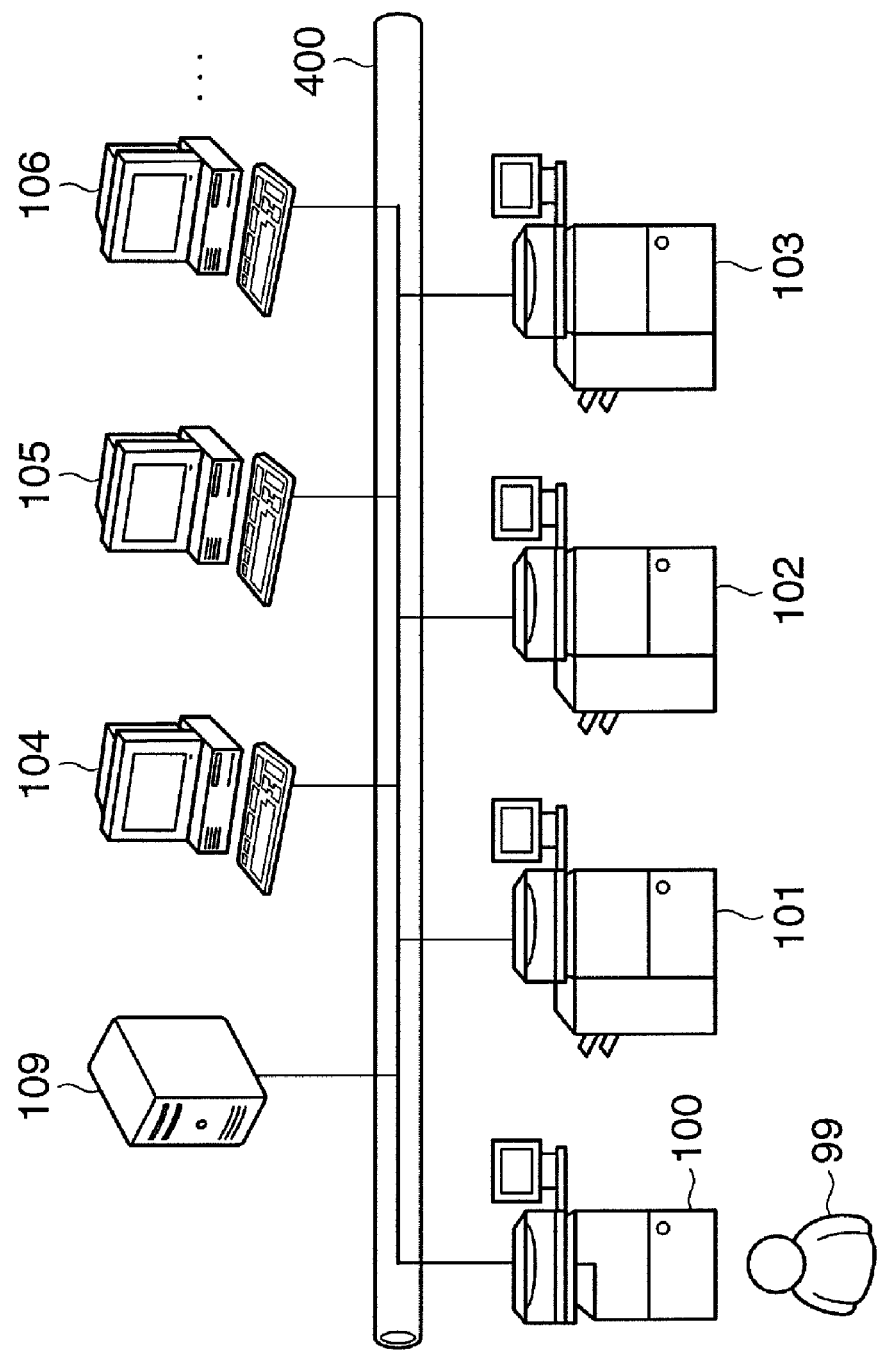
FIG. 3 is a diagram useful in describing another example of the configuration of an information processing apparatus according to an embodiment of the present invention.

FIG. 3 illustrates an example of the configuration of an information processing apparatus in a case where the UDDI is utilized. Service providing devices 104, 105, 106 and the service providing devices 101, 102, 103 register service-related information in a service management server (UDDI) 109. The service management server (UDDI) 109 is equipped with an information acquisition function. The service management server (UDDI) 109 can be searched from the service utilizing device 100 as to what are the service functions that can be provided. In this case, there are instances where a plurality of the service management servers (UDDI) 109 exist.

FIGS. 4 and 5 are diagrams useful in describing the location of the service management server 109 corresponding to the above-mentioned UDDI. FIG. 4 illustrates an example in which the function of the service management server 109 corresponding to the UDDI is provided in each of the service providing devices 101, 102, 103. The service providing devices 101, 102, 103 place their respective functions in the form of service items and register service-related information in service management servers set up within the service provided devices.

In this case, the registered service items are listed up and held as the service management server functions in the manner of service lists 501, 502, 503, by way of example. In this case it is required that all of the service providing devices 101, 102, . . . connected by the LAN 400 be searched from the service utilizing device 100 with regard to the service-related information.

FIG. 5 illustrates an example of a case where the service management server function corresponding to the UDDI is provided only in the service providing device 101. The service providing devices 101, 102, 103 put their respective available functions in the form of service items and register service-related information in a service management server set up in the service provided device 101. In this case the service providing device 101 is equipped with the information acquisition function.

In this case, the registered service-related information is listed up and held as the service management server functions in the manner of a service list 504, by way of example. It will suffice if only the service management server functions set in the service providing device 101 are searched from the service utilizing device 100 with regard to service-related information.

It should be noted that there are cases where a screen of function setting items of service utilization or a display of a service list is changed in operative association with selection of a function of a service providing device. In this case, it is necessary to acquire device information in order to determine the configuration and functions, such as capabilities, of the service providing devices 101, 102, . . . in addition to the above-mentioned service-related information. To achieve this, the service utilizing device 100 acquires device information such as the configuration and capabilities of the individual service providing devices 101, 102, . . . when a service search is conducted.

Information concerning the configuration of each of the service providing devices 101, 102 includes information as to whether or not there are provided a finisher and ancillary stapler and puncher, a duplexer or double-sided printing and a FAX board, etc., and paper-feed cassette information indicating the paper size in a paper-feed cassette. In relation to capability, e.g., in relation to a printing function, the information includes whether or not a color printing function is available, the type of PDL that can be processed and a protocol relating to a network transmission function. By way of example, these include e-mail, FTP and SMB, etc., and transmission mode (G3, G4, whether or not a color communication function is available, etc.) relating to a FAX function. Accordingly, these items of information are adopted as device information. It should be noted that the configurations and capabilities mentioned here are examples only and do not impose any limitation.

The configuration of an information processing apparatus in an embodiment of the invention will now be described in detail. The service management server necessary in this embodiment may exist as a single server or it may be so arranged that each individual service providing device possesses a service management server.

A search result list 510 in FIG. 6 is an example of a search result list generated by the service utilizing device 100 based upon service-related information and device information acquired from the service management server 109 or from the service management server functions of the respective service providing devices 101, 102, . . . . The search result list 510 is stored in the hard-disk drive (HDD) 170 or memory (not shown) incorporated in the service utilizing device 100. For example, if the information is service-related information, we have the following: service name: Print A; service-related information: Copy (which indicates that a copy function is available) and PS (PostScript is capable of being processed as the type of PDL), etc. Further, if the information is device information, this is device information acquired from each individual device, e.g., shift-tray function, duplexer or double-sided unit function, and information such as 1000 sheets in an A4 cassette, 500 sheets in an A3 cassette, etc.

In order to generate the search result list 510, the service utilizing device 100 acquires these items of service-related information and device information at one time when it is started up, by way of example. The service-related information and device information is acquired and stored before the user 99 operates the control panel 150. As a result, it is unnecessary to conduct a search via the network 400 whenever there is a change in service content, a high-speed change in display synchronized to selection of a service providing device becomes possible, and operability by the user 99 is enhanced.

Next, a screen of a GUI (Graphical User Interface) displayed on the control panel 150 will be described with reference to FIG. 7. The liquid crystal display unit 160 mentioned earlier has a display screen 601. A display presented on the liquid crystal display unit 160 is executed by a display control function with which the controller 110 is equipped.

Figure 7:
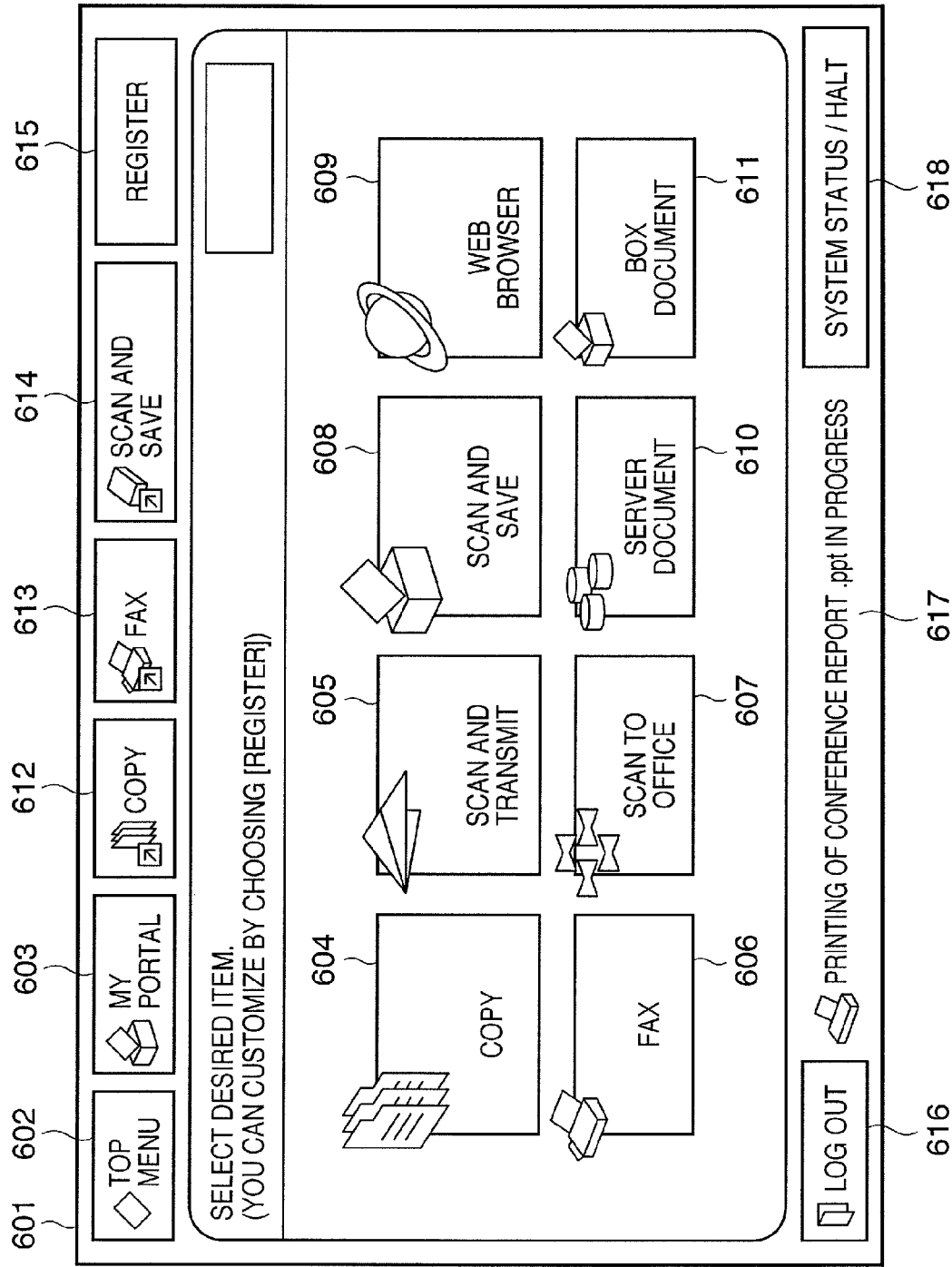
FIG. 7 is a diagram useful in describing an example of a display screen displayed by a liquid crystal display unit on a control panel used by an information processing apparatus according to an embodiment of the present invention.

A TOP MENU key 602 is a key provided in order to return to the GUI display screen of the top menu illustrated in FIG. 7. A MY PORTAL key 603 can be pressed by the user, whereupon the display unit displays a GUI screen carrying only information relating to the user 99 who has logged in (the information is information pertaining to a job that has been input by the user 99, a user-specific key display, etc.).

Also provided are various function keys 604 to 611, and short-cut keys 612 to 614 to various functions. A REGISTER key 615 is a key for registering the short-cut keys 612 to 614. A LOG OUT key 616 is a key for logging out from the current user session. A status line 617 is an area for displaying information about a job in progress as well as warning information concerning consumables (toner, etc.). A system status key 618 is a key for displaying a GUI that makes it possible to view information such as a list of jobs currently in progress and a job-log list.

Figure 8:
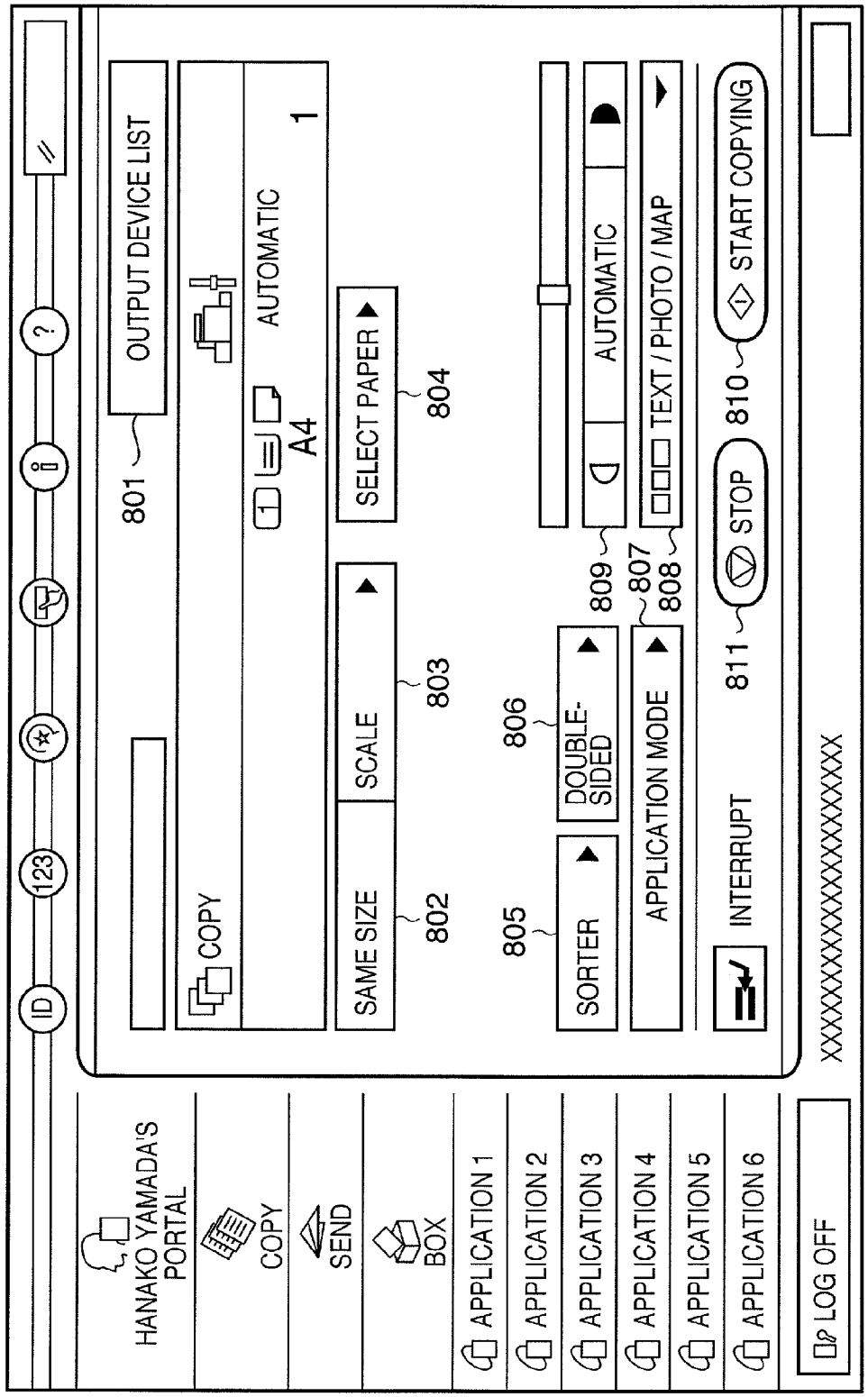
FIG. 8 is a diagram useful in describing an example of a display of a copy function screen used by an information processing apparatus according to an embodiment of the present invention.

FIG. 8 illustrates an example of a GUI screen when a copy function is set. This is a screen displayed when a copy function key 604 shown in FIG. 7 is pressed. An OUTPUT DEVICE LIST key 801 is a key for displaying a GUI screen used in output-device selection for setting an output device from a candidate list of service providing devices, which are output devices of the kind shown in FIG. 9. Various setting keys 802 to 809 are provided for changing various settings when copying is performed. A COPY START key 810 is for starting the copying operation based upon settings that have been made. A STOP key 811 is a key for stopping a copying operation that is in progress.

Figure 9:
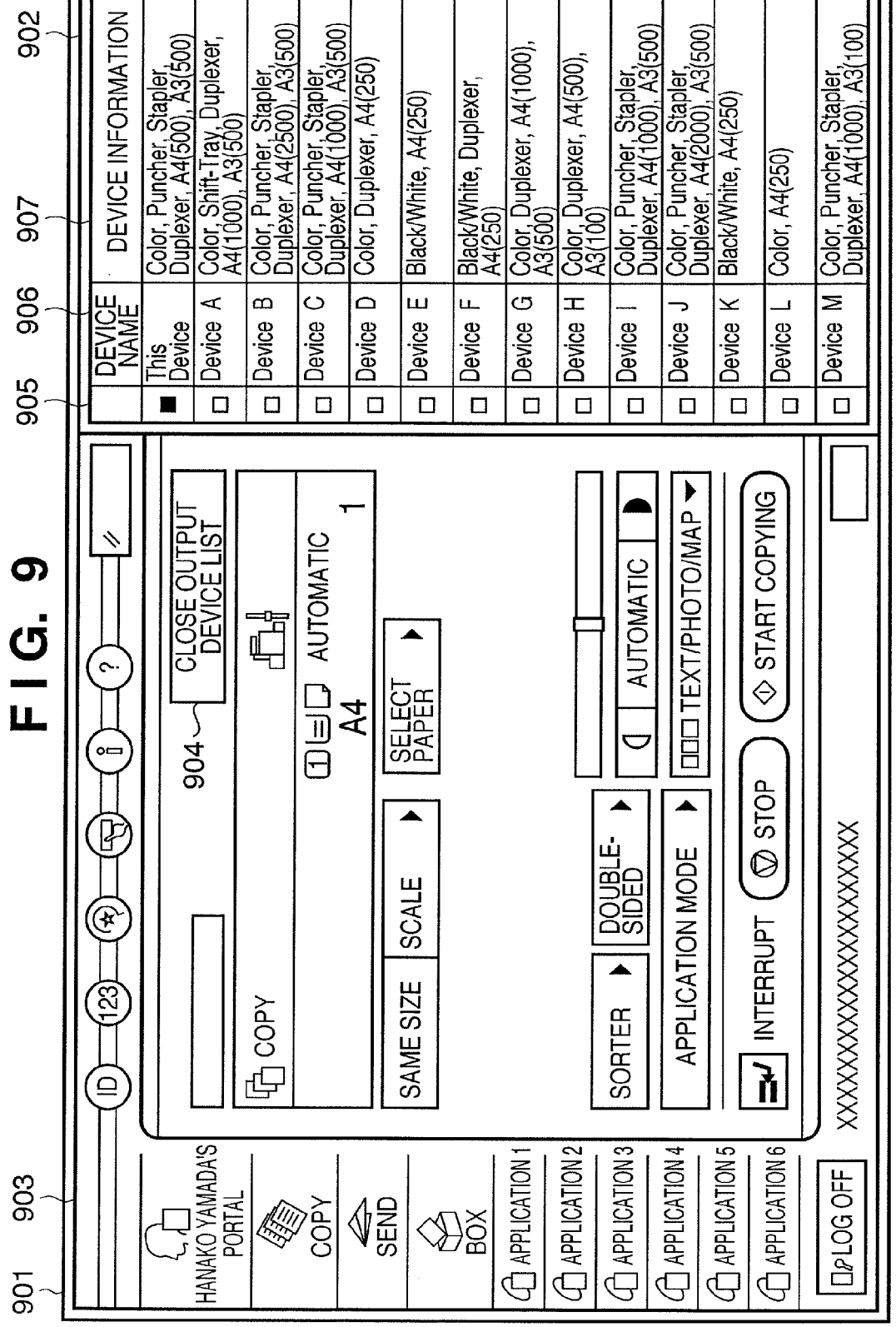
FIG. 9 is a diagram useful in describing an example of a change in a screen display in a case where an output device or setting has been changed on a copy function screen used by an information processing apparatus according to an embodiment of the present invention.

FIG. 9 illustrates a GUI screen used in output-device selection for selecting an output device if the OUTPUT DEVICE LIST key 801 in FIG. 8 has been pressed. The liquid crystal display unit 160 has a display screen 901. A screen 902 is for selecting an output device. In this example, the description relates to a screen for setting the copy function and therefore the only service providing devices displayed are those that provide a copy service, which is the service corresponding to the screen for setting the copy function. A GUI screen 903 is for making the copy function setting described in FIG. 8. A key 904 is for closing the output device list. If this key is pressed, the output device list at 902 is closed and the display returns to the GUI screen display of FIG. 8.

A column at 905 on the screen 902 for selection of the output device is a column of selection check boxes for selecting service providing devices and is used in order to select output devices. A column 906 is a column of names of service providing devices. Here the names of service providing devices of output device candidates are displayed. A column 907 is a column of items of device information. Displayed in this column is device information such as color/monochrome, finisher type, duplexer or double-sided, paper cassette information, etc.

An operation for changing the setting screen in sync with operation for selecting an output device will be described with reference to FIGS. 9 to 13.

In a case where the setting is for output to the service providing device itself, which is the default when the copy function is utilized, the list for selecting service providing devices, which are output devices, is displayed in the manner shown in FIG. 9. That is, the displayed state is one in which only the check box corresponding to "This Device" has been selected. At this time the names of service providing devices "This Device", "Device B", "Device C" possessing functions equal to those of "This Device" are displayed in highlighted fashion in the form of bold characters. Furthermore, the names of service providing devices "Device I", "Device J" and "Device M" also are displayed in highlighted fashion in the form of bold characters. In this state in which "This Device" only has been selected, the setting relating to the copy function is not restricted and hence there is no change in the copy setting screen 903.

Figure 10:
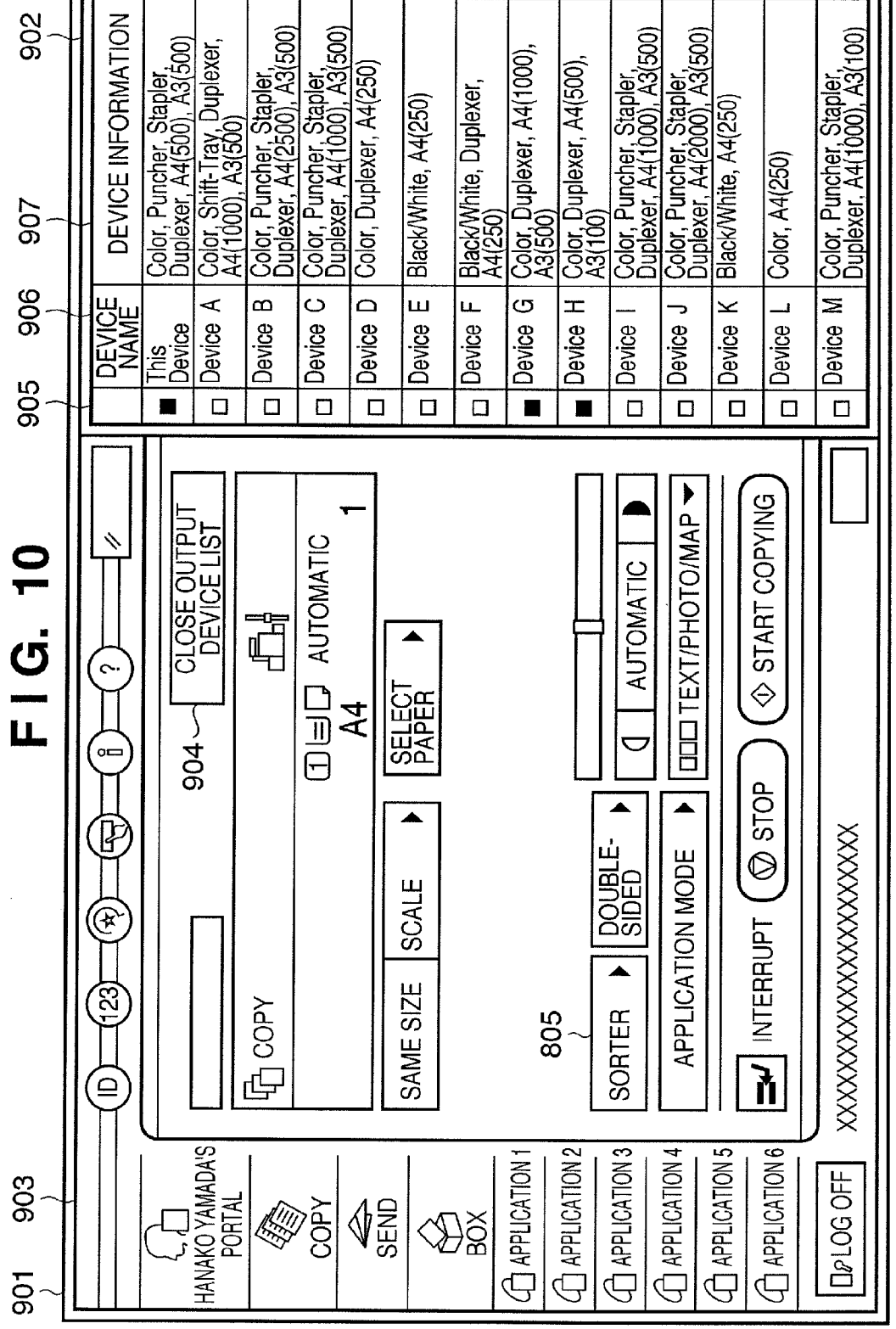
FIG. 10 is a diagram useful in describing another example of a change in a screen display in a case where an output device or setting has been changed on a copy function screen used by an information processing apparatus according to an embodiment of the present invention.

If "Device G" and "Device H" are selected under these conditions, the functions thereof are determined and the display shown in FIG. 10 is obtained. Since "Device G" and "Device H" are service providing devices that do not have a finishing function, these are not available. Accordingly, the sorter key 805 on the copy setting screen 903 is dimmed to arrange it so that this key cannot be pressed, thereby making this setting impossible.

Further, on the screen 902 of the list of service providing devices, the service providing devices equipped with the functions possessed in common with the selected "This Device", "Device G" and "Device H" are displayed in highlighted form. In this case, the functions possessed in common with "This Device", "Device G" and "Device H" are "Color", "Duplexer", "A4" and "A3". Accordingly, "This Device", "Device A" and "Device B", which have these print functions, are displayed in highlighted form. Furthermore, "Device C", "Device G", "Device H", "Device I", "Device J" and "Device M" are also displayed in highlighted form.

Figure 11:
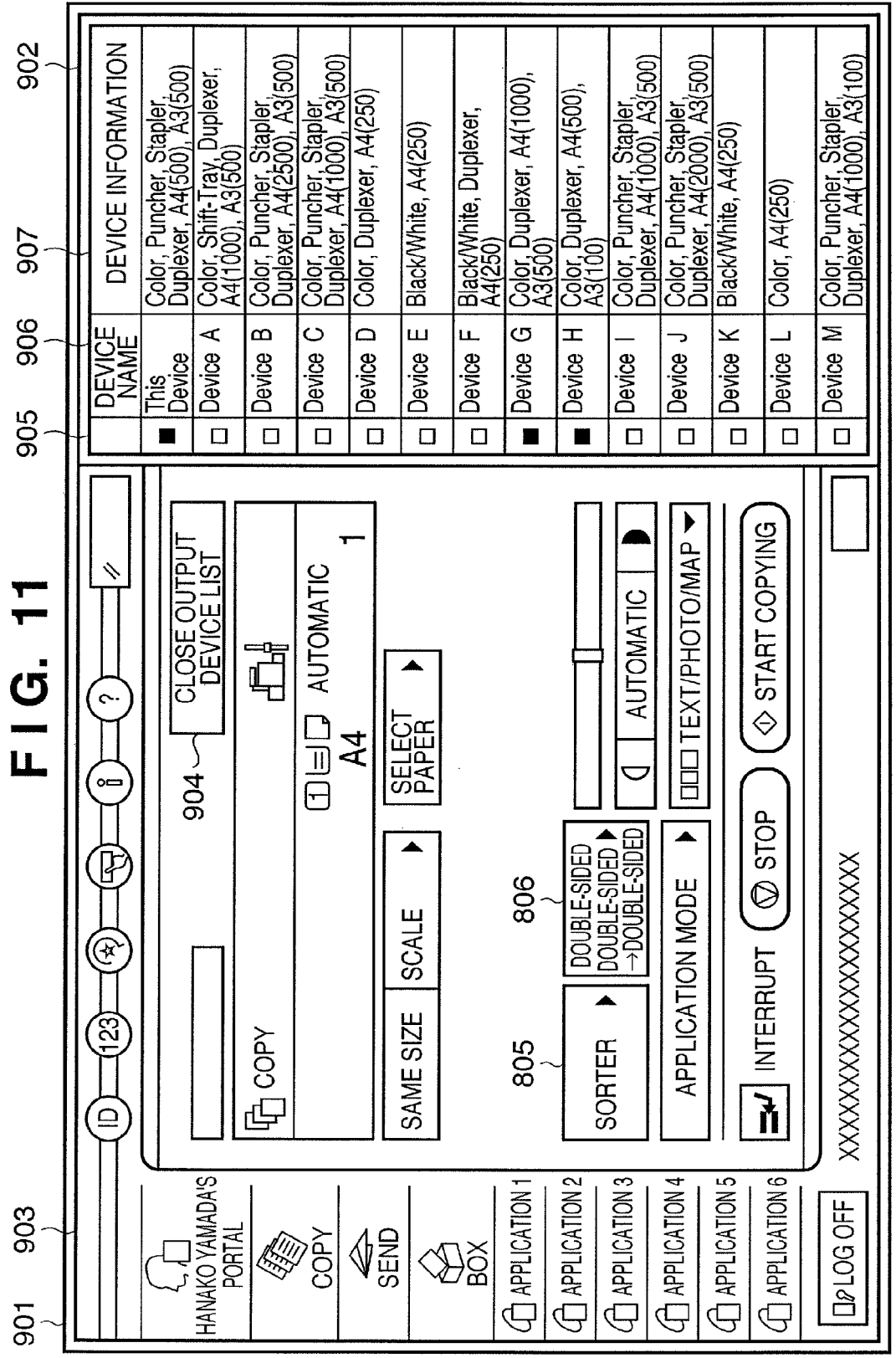
FIG. 11 is a diagram useful in describing a further example of a change in a screen display in a case where an output device or setting has been changed on a copy function screen used by an information processing apparatus according to an embodiment of the present invention.

Next, processing in a case where a service providing device that does not support an already existing setting item has been additionally selected will be described. Basically, the processing below is executed by the controller 110. First, if the doubled-sided setting has been made by the user 99 under the conditions shown in FIG. 10, the GUI screen display on the liquid crystal display unit 160 of control panel 150 changes as illustrated in FIG. 11. At this time a double-sided setting key 806 is displayed in inverse video so as to notify the user 99 that this is a state in which double-sided printing has been set. If "Device LT", which does not possess the doubled-side printing function, and its functions are determined in the state illustrated in FIG. 11, then the display becomes as shown in FIG. 12.

Figure 12:
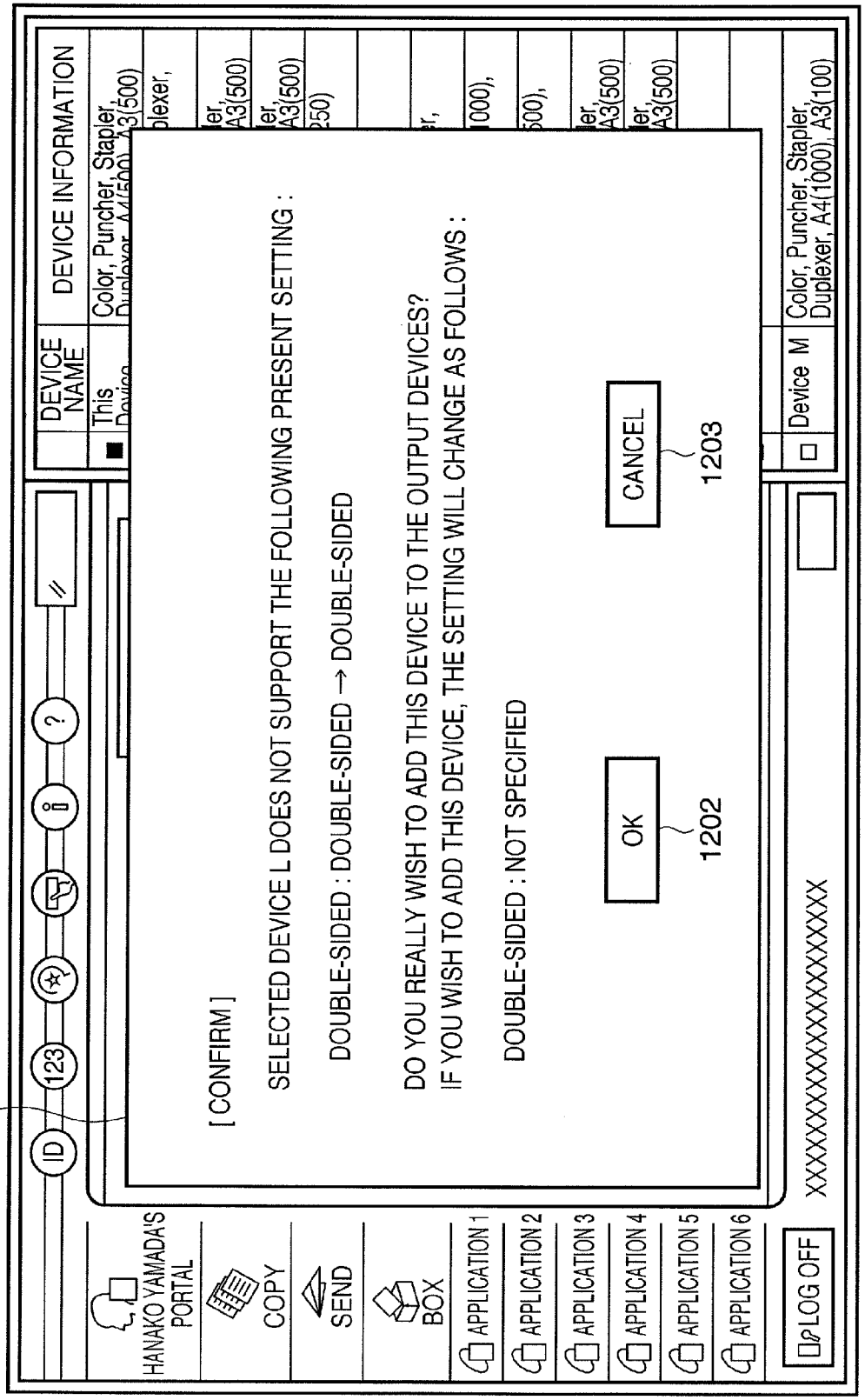
FIG. 12 is a diagram useful in describing a further example of a change in a screen display in a case where an output device or setting has been changed on a copy function screen used by an information processing apparatus according to an embodiment of the present invention.

In FIG. 12, a confirmation dialog screen 1201 appears for the purpose of confirming that a service providing device that does not support the present setting content, namely a non-utilizable service providing device, has been selected as the output device. Displayed on the confirmation dialog screen 1201 is setting content that is prohibited from being set because it is not supported by the newly selected service providing device. Also displayed is how the setting will change if this service providing device is added on.

Figure 13:
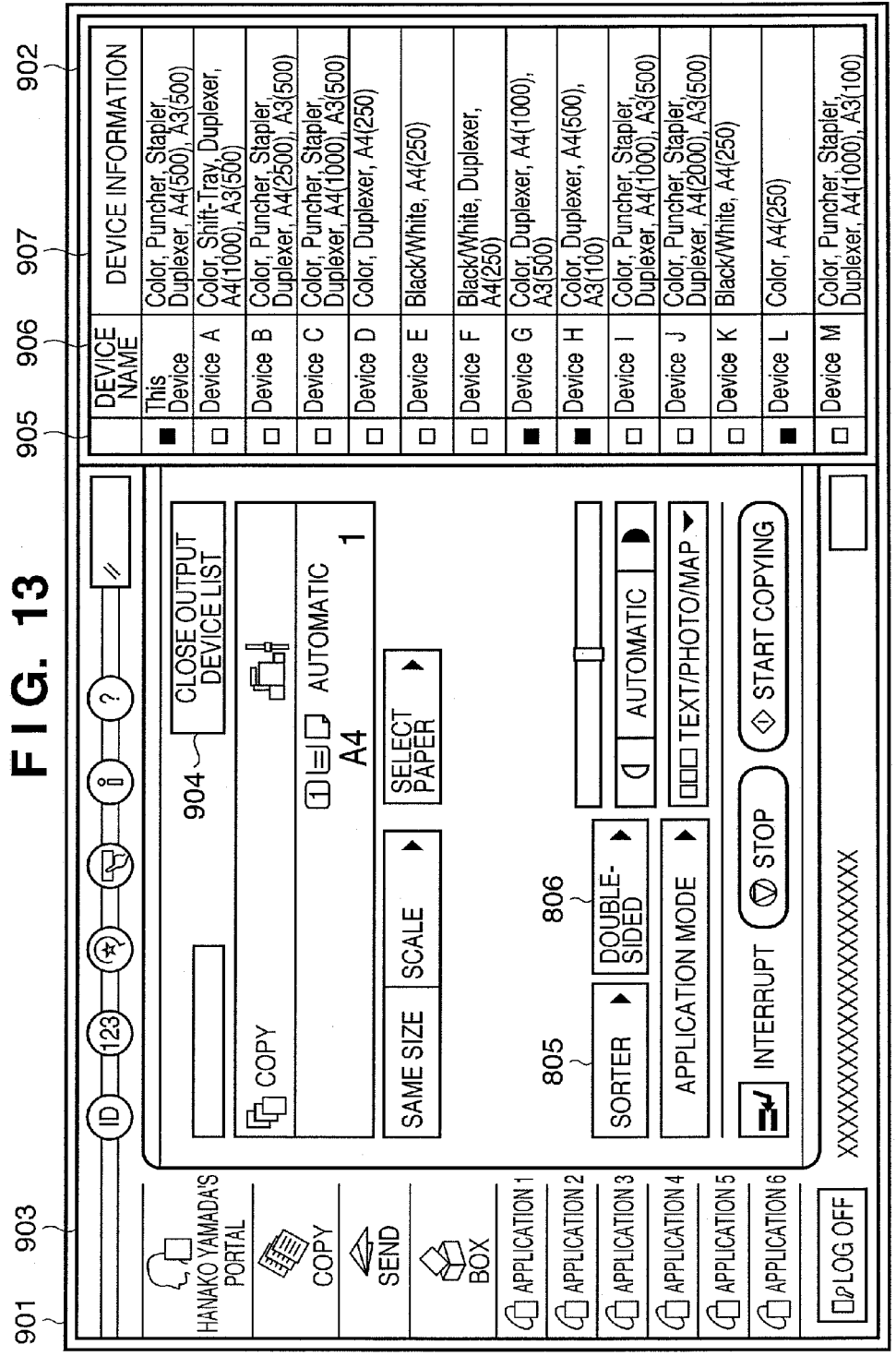
FIG. 13 is a diagram useful in describing a further example of a change in a screen display in a case where an output device or setting has been changed on a copy function screen used by an information processing apparatus according to an embodiment of the present invention.

An OK key 1201 is for continuing processing that adds on the service providing device, which has been specified by the user 99, as an output device. A Cancel key 1203 is for canceling selection of the service providing device specified by the user 99. If the OK key 1202 is pressed, a GUI screen illustrated in FIG. 13 is displayed. If the Cancel key 1203 is pressed, the screen returns to the GUI screen of FIG. 11.

FIG. 13 illustrates a GUI screen for the case where the OK key 1202 in FIG. 12 has been pressed. "Device L" does not support double-sided output and therefore utilization thereof is disabled, the doubled-sided print setting is cancelled and the double-sided setting key 806 on the screen 902 for setting the copy function is dimmed to prohibit the setting thereof. As a result, the key 806 cannot be pressed. Further, on the screen 906 for selecting service providing devices, service providing devices having capabilities shared in common with the selected service providing devices are displayed in highlighted form.

Accordingly, service providing devices having the print functions "Color" and "A4", which are possessed in common by "This Device", "Device G" "Device H" and "Device L", are displayed in highlighted form. In this example, "This Device", "Device A" and "Device B" are displayed in highlighted form. Furthermore, "Device C", "Device D", "Device G", "Device H", "Device I", "Device J", "Device L" and "Device M" are also displayed in highlighted form.

The specific processing flow of the processing set forth above will now be described with reference to the flowchart of FIG. 14.

Figure 14:
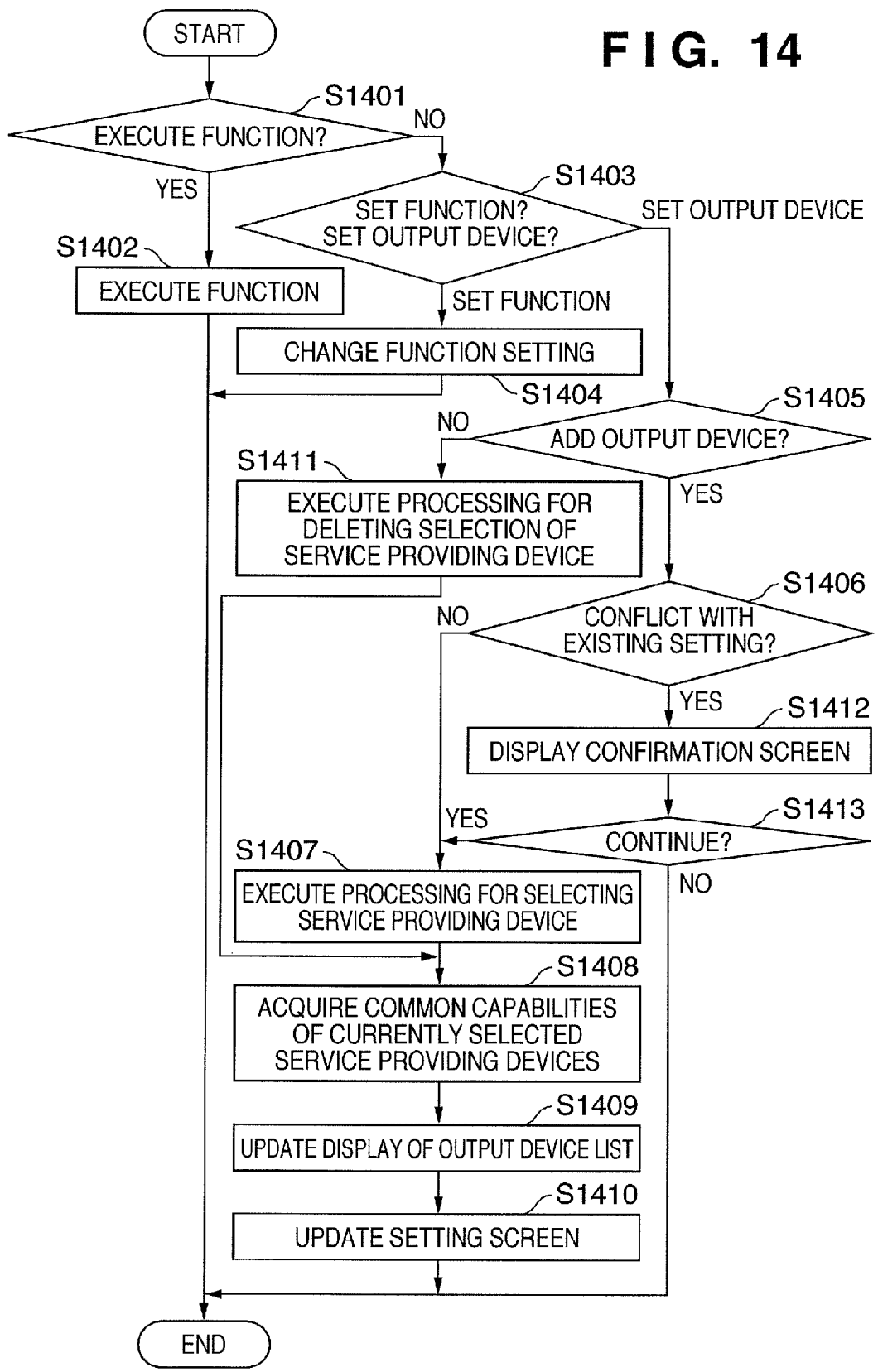
FIG. 14 is a flowchart for describing processing when a command is received from a user in an information processing apparatus according to an embodiment of the present invention.

FIG. 14 is a flowchart illustrating the flow of processing when the user 99 has made an indication of the copy-function setting screen using the control panel 150. This flowchart illustrates the flow of processing executed by having the controller 110 read and interpret program code that has been stored on the hard-disk drive 170.

First, at step S1401 following the start of processing, it is determined whether the indication made by the user 99 is a command to execute a function. If the decision rendered is "YES", then control proceeds to step S1402. Here processing to execute the copy function is performed based upon the present setting content and then processing is exited. On the other hand, if the decision rendered at S1401 is "NO", then control proceeds to step S1403. It should be noted that each decision is implemented by having the controller 110 execute a function for rendering function decisions.

It is determined at step S1403 whether the indication from the user 99 is a command to set a function or a command to set an output device. In case of a function-setting command, control proceeds to step S1404, where the setting in the specified setting content is changed and processing is then exited. On the other hand, in case of an output-device setting command, control proceeds to step S1405.

At step S1405, it is determined whether the command from the user 99 is to add on a service providing device, which is an output device, or delete a service providing device, which is an output device. If the command from the user 99 is to add on the device, control proceeds to step S1406. Here it is determined whether there is no conflict between the capabilities of the service providing device specified to be added on and the content of the present function setting. If there is no conflict, control proceeds to step S1407. Here the check box of the specified service providing device is placed in the selected state on the screen for selecting service providing devices. Control then proceeds to step S1408.

At step S1408, the capabilities possessed in common by all service providing devices currently selected are stored. Control then proceeds to step S1409, at which the names of service providing devices having all of the capabilities stored at step S1408 are displayed in highlighted form. Control then proceeds to step S1410.

At step S1410, keys other than setting keys relating to the capabilities stored at step S1408 are dimmed, and processing is then exited. If a setting of some kind has already been made with respect to a dimmed setting item, then processing for returning to the state which prevailed before the setting is executed.

Further, if it is determined at step S1405 that an output device is not to be added on, then control proceeds to step S1411. Here the check box of the specified service providing device is placed in the unselected state and control proceeds to step S1408. Processing from this step onward is as described above.

Further, if it is determined at step S1406 that there is a conflict with the presently existing setting, then control proceeds to step S1412. Here the confirmation screen illustrated in FIG. 12 is displayed and control proceeds to step S1413. As for control for displaying the confirmation screen, the controller 110 performs the function of display control means to display the screen.

It is determined at step S1413 whether to accept an input from the user 99 and continue with processing for adding on the service providing device, or to cancel operation. It is determined to continue if the OK key 1202 in FIG. 12 is pressed and to cancel if the Cancel key 1203 is pressed. If it is determined to continue, the dialog screen being displayed is closed at control proceeds to step S1407, where processing similar to that described above is executed. If it is determined to cancel, the dialog screen being displayed is closed and processing is exited.

Thus, as described above, when service providing devices desired to be used by the user 99 are selected, service providing devices having functions possessed in common by selected service providing devices are displayed in an identifiable manner. As a result, in a case where it is desired to make an output to a plurality of service providing devices with the same settings, the user 99 can perform the operation of selecting a service providing device in an efficient manner.

Further, the screen for setting a function changes in sync with the selection of a service providing device that is an output device. Therefore, since unnecessary setting operations need no longer be performed, user convenience is enhanced. Further, since the confirmation screen is displayed in circumstances where an existing setting will be invalidated, a setting will no longer be output upon being changed contrary to the intentions of the user 99. Although a copy setting function has been described in this embodiment, this does not impose a limitation upon the present invention. The present invention can also be applied to other functions, such as in the case of a transmission function where the transmission function of another service providing device is utilized to perform transmission.

Other Embodiments

In the embodiment described above, a search of services and devices is conducted at start-up. However, the control panel 150 may be provided with a search-again key to make it possible for the user to conduct a search again at any timing desired by the user. Further, it may be so arranged that a search is conducted again periodically in addition to at start-up and the search result list is updated.

Further, in the embodiment described above, it is so arranged that the names of service providing devices having equivalent capabilities are displayed in highlighted form on the screen for selecting output devices. However, it may be so arranged that the names of service providing devices determined to have equal functions are displayed at the top of a table and are rearranged and displayed there-below in the order in which the devices have functions that are near one another. With such an arrangement, service providing devices determined to have equal functions are displayed successively at the tope of the list. This leads to enhanced operability for the user 99 in a case where the selection of a plurality of service providing devices having equal functions is performed frequently.

In the embodiment described above, it is so arranged that service providing devices that have been detected by a device search are all displayed as output-device candidates. However, it may be so arranged that the service providing devices displayed in the list are narrowed down beforehand according to information on installation location, IP address and type, etc. Adopting such an arrangement makes it possible to improve operability in an environment in which a large number of service providing devices exist.

Further, the object of the present invention can also be attained by supply a system or apparatus with a storage medium storing the program code of software for implementing the functions of the above-described embodiment. That is, it goes without saying that object of the invention may also be attained by reading and executing program code, which has been stored on a storage medium, using the computer (or CPU or MPU) of this system or apparatus. In this case, the program codes per se read from the storage medium implement the novel functions of the embodiment and the storage medium storing the program codes constitutes the invention.

Examples of storage media that can be used for supplying the program code are a flexible disk, hard disk, optical disk, magneto-optical disk, CD-ROM, CD-R, magnetic tape, non-volatile type memory card or ROM, etc. Further, there are also cases where the functions of the above-described embodiment are implemented by executing program code read out by computer.

However, it goes without saying that the present invention also covers a case where an operating system or the like running on the computer performs a part of or the entire actual process based upon the designation of program codes and implements the functions according to the embodiment described above.

Furthermore, there can also be cases where program code read from a storage medium is written to a memory provided on a function expansion board inserted into the computer or provided in a function expansion unit connected to the computer. Thereafter, a CPU or the like provided on the function expansion board or function expansion unit performs a part of or the entire actual process based upon the designation of program codes, and the functions of the above embodiment are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-308407, filed Nov. 14, 2006, which is hereby incorporated by reference herein in its entirety.

What is claimed is:

1. An information processing apparatus for utilizing services provided by a plurality of service providing devices that exist on a network, comprising:

an information acquiring unit configured to acquire device information concerning the plurality of service providing devices and service-related information relating to services capable of being provided by the plurality of service providing devices;

a first display control unit configured to display a list of service functions of available services based upon the device information and service-related information;

a service-function selecting unit configured to select a service function to be utilized from the list of service functions of available services displayed by said first display control unit;

a service-function judging unit configured to judge utilizable service functions based upon the service to be utilized selected by said service-function selecting unit; ad a second display control unit configured to identifiably display the utilizable service functions judged by said service-function judging unit;

an availability judging unit configured to judge setting items relating to non-available service functions among services capable of being provided by the plurality of service providing devices, based upon the utilizable service functions judged by said service-function judging unit;

a setting prohibiting unit configured to prohibit the setting of a service function judged to be unavailable by said availability judging unit;

a conflicting-service-function detecting unit configured to detect a service function for which the setting of the setting item that is currently selected will be impossible owing to selection of a specific service function by said service-function selecting unit; and a confirmation-screen display control unit configured to display a confirmation screen if a service function for which the setting will be impossible is detected, said configuration screen indicating the fact that this service function has been detected.

2. A method of controlling an information processing apparatus for utilizing services provided by a plurality of service providing devices that exist on a network, comprising:

an information acquiring step adapted to acquire device information concerning the plurality of service providing devices and service-related information relating to services capable of being provided by the plurality of service providing devices;

a first display control step adapted to display a list of service functions of available services based upon the device information and service-related information;

a service-function selecting step adapted to select a service function to be utilized from the list of service functions of available services displayed at said first display control step;

a service-function judging step adapted to judge utilizable service functions based upon the service to be utilized selected at said service-function selecting step;

a second display control step adapted to identifiably display the utilizable service functions judged at said service-function judging step;

an availability judging step adapted to judge setting items relating to non-available service functions among services capable of being provided by the plurality of service providing devices, based upon the utilizable service functions judged at said service-function judging step;

a setting prohibiting step adapted to prohibit the setting of a service function judged to be unavailable by said availability judging step;

a conflicting-service-function detecting step adapted to detect a service function for which the setting of the setting item that is currently selected will be impossible owing to selection of a specific service function by said service-function selecting unit; and a confirmation-screen display control step adapted to display a confirmation screen if a service function for which the setting will be impossible is detected, said configuration screen indicating the fact that this service function has been detected.

3. A non-transitory computer-readable storage medium storing a program that, when executed by a computer, causes the computer to implement a method of controlling an information processing apparatus for utilizing services provided by a plurality of service providing devices that exist on a network, comprising:

an information acquiring step adapted to acquire device information concerning the plurality of service providing devices and service-related information relating to services capable of being provided by the plurality of service providing devices;

a first display control step adapted to display a list of service functions of available services based upon the device information and service-related information;

a service-function selecting step adapted to select a service function to be utilized from the list of service functions of available services displayed at said first display control step;

a service-function judging step adapted to judge utilizable service functions based upon the service to be utilized selected at said service-function selecting step;

a second display control step adapted to identifiably display the utilizable service functions judged at said service-function judging step;

an availability judging step adapted to judge setting items relating to non-available service functions among services capable of being provided by the plurality of service providing devices, based upon the utilizable service functions judged at said service-function judging step;

a setting prohibiting step adapted to prohibit the setting of a service function judged to be unavailable by said availability judging step;

a conflicting-service-function detecting step adapted to detect a service function for which the setting of the setting item that is currently selected will be impossible owing to selection of a specific service function by said service-function selecting unit; and a confirmation-screen display control step adapted to display a confirmation screen if a service function for which the setting will be impossible is detected, said configuration screen indicating the fact that this service function has been detected.

\* \* \* \* \*